Nov. 18, 1969   W. E. HUMPHREY   3,479,108
DISPLACED IMAGE REFLECTING OPTICAL STABILIZED SYSTEM
Filed Sept. 4, 1968
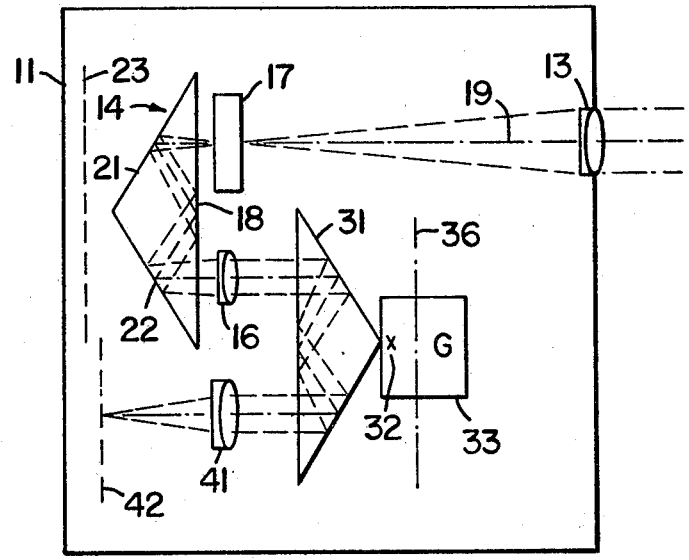
FIG_1
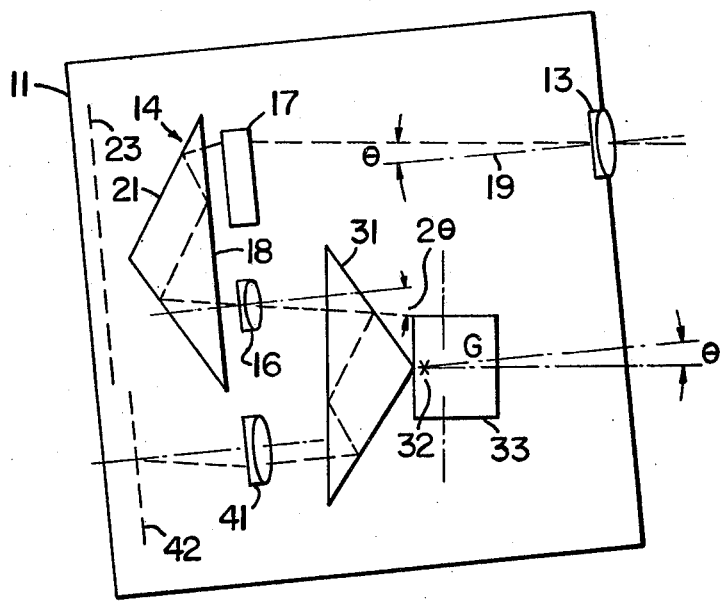
FIG_2
INVENTOR.
WILLIAM E. HUMPHREY
BY
Townsend and Townsend
ATTORNEYS United States Patent Office 3,479,108
Patented Nov. 18, 1969

3,479,108
DISPLACED IMAGE REFLECTING OPTICAL
STABILIZED SYSTEM
William E. Humphrey, Oakland, Calif., assignor to
Optical Research and Development Corporation,
Oakland, Calif., a corporation of California
Filed Sept. 4, 1968, Ser. No. 757,305
Int. Cl. G02b 23/00, 23/02
U.S. Cl. 350—16                              3 Claims

ABSTRACT OF THE DISCLOSURE

An image stabilizing device having an objective lens and a display screen upon which an image is formed by the objective lens and is viewed on the obverse side thereof by collimating optics whereby stabilization then occurs by an inertially stabilized reflecting media mounted within the collimated optical path.

---

This invention relates to a new and improved image stabilizing system useful in cameras and telescopes.

It is an object of the present invention to provide an image stabilizing system which stabilizes the viewed image formed by a telescope objective lens despite motion or vibration of the telescope objective lens, viewing optics, and telescope housing. The invention is thus particularly applicable to hand-held cameras and ocular telescopes or cameras and ocular telescopes mounted on moving systems. For ocular viewing devices it may be adapted for either monocular or binocular use.

In order to accomplish these results, the present invention contemplates providing an objective lens and a transmissive image display plate having a first surface positioned in the focal plane of the objective lens and a second surface on which a real image formed by the objective lens and transmitted from the first surface is displayed. Light from the image displayed on the second surface of the image display plate is collimated by a collimating lens and the collimated light passed through an inertially stabilized optical element mounted for free movement relative to the objective lens, image display plate, and collimating lens. A stabilized image is formed thereafter from the collimated light received from the inertially stabilized optical element by viewing means for camera or ocular viewing. The invention is adapted for image stabilization in either cameras or ocular telescopes and binoculars. Thus, "viewing optics" and "viewing means" are used generally to include both camera viewing means and ocular eyepiece systems.

According to one embodiment of the invention, light from an image displayed on the transmissive image display plate is retroreflected substantially in the direction of the field of view by a first triple reflecting, three-sided prism. The retroreflected light is collimated by a collimating lens. The collimated light enters a second triple reflecting, three-sided prism for retroreflection in the direction of the viewing means. The second triple reflecting prism is inertially stabilized by, for example, a gyroscope, and gimbal mounted for free movement relative to the objective lens, image display, first triple reflecting prism, collimating lens, and viewing means, all of which are rigidly connected with respect to the telescope or camera housing. The collimated light is thereby stabilized in the second prism for providing a stabilized image.

Each of the triple reflecting prisms provides the optical equivalent of a plane reflecting mirror at a position behind the prism with translation or lateral displacement of the incident light along the mirror surface a predetermined distance, depending upon the dimensions of the prism. Because the inertially stabilized prism functions as an equivalent reflecting surface, upon angular deviation of the camera or telescope housing from the original line of sight the stabilized element deflects the incident collimated light through twice the angle of deviation of the housing from the original line of sight, providing twice the angular deflection required to stabilize an image. To compensate for the double angular deflection produced by the inertially stabilized triple reflecting prism, the collimating lens is chosen to provide 2× magnification to thereby produce a compensating angular magnification of 2 over the angular size of the scene apparent at the first objective of the instrument.

The retroreflecting, trip reflecting, three-sided prisms provide a compact folded optical path for use in compact cameras and ocular viewing devices. According to other aspects of the invention, however, the optical path need not be so folded and the inertially stabilized optical element may be a plane reflecting mirror or an optical element which functions as an effective reflecting surface to the extent that a plane in the element can be defined for which angle of incidence and angle of emergence for a ray are equal.

It is possible with the image stabilizing systems described above to achieve the image stabilization required for accidental motion compensation in either cameras or ocular viewing devices. For camera application, accidental motion compensation should maintain an image from the objective substantially stationary or in a fixed position on a film plane. In this way, small movements or vibrations of the camera housing to which the objective and film plane are mounted will be properly compensated so that a 100% stabilized image is presented to the film at the coincident stabilized image plane and film plane. On the other hand, ocular viewing devices such as ocular telescopes and binoculars may require a modified stabilization other than 100%, so that light rays leaving the device are parallel to light rays entering the device and will therefore not appear to the viewer to be deflected with the vibrations. A full explanation of this difference in stabilization is set forth in my copending patent application Ser. No. 575,624, filed in the United States Patent Office on Sept. 1, 1966 and entitled "Optical Stabilization by Reflecting Means." Reference is made to such above-identified patent application for a complete discussion of this point. However, it is briefly noted herein that camera stabilization, or 100% stabilization, as it is sometimes termed, is to be modified by the factor $(1 \pm 1/M)$ for ocular viewing devices wherein M is the overall magnification of the optical system. The fraction of "camera stabilization" required for erecting viewing devices is $(1-1/M)$ and, for inverting viewing devices the fraction of "camera stabilization" is $(1+1/M)$. In the following discussion of the present invention, reference is generally made to 100% camera stabilization; and it is to be understood that such is to be modified by the foregoing factor for ocular viewing devices, such as binoculars, ocular telescopes and the like.

Thus, in the embodiment of the invention summarized above wherein the inertially stabilized optical element is a plane reflecting mirror or a triple reflecting three-sided prism providing an effective plane mirror reflecting surface behind the prism with lateral displacement or translation of the incident light along the surface of the effective mirroring plane, the collimating lens should have an angular magnification power of $2 \div (1 \pm 1/M)$. For astronomical and inverting telescopes the angular magnification power of the collimating lens should be ideally $$2 \div (1 + 1/M)$$

while for erecting or terrestrial telescopes the magnification power of the collimating lens should be, ideally, $2 \div (1 - 1/M)$.

Other objects, features and advantages of the present invention will become apparent in the following specification and accompanying drawings.

In the drawings:

FIG. 1 is a diagrammatic view of a camera image stabilizing system embodying the present invention.

FIG. 2 is a diagrammatic view of the camera image stabilizing system illustrated in FIG. 1 showing an angular deviation, $\theta$, of the camera optical axis from the original line of sight.

In the embodiment of the present invention illustrated in FIG. 1 there is provided a camera housing 11 having an opening with an objective lens 13 mounted therein for receiving light from a surveyed field. Rigidly connected to the camera housing and positioned in the focal plane of objective lens 13 is a transmissive image display plate 17 on which is displayed a real image formed by the objective lens 13. The image display plate 17 is formed, for example, by a frosted translucent screen, a fiber optics fused plate, or an image intensifier. The image display plate 17 is adapted to receive a real image formed by the objective lens 13 and transmit the image for display on its opposite side. Thus, the first surface of the image display plate is positioned in the focal plane of the objective lens 13 and the second surface is adapted to display an image transmitted from the first surface.

Light from an image displayed on the image display plate 17 is retrodirected and translated by a triple reflecting three-sided prism 14, also rigidly connected to the camera housing 11. The triple reflecting prism 14 has a cross-sectional configuration in the form of an isosceles triangle having base angles in the range of approximately 15° to 45° so that light received through the front surface 18 is totally internally reflected at the first side 21, again at the base 18, and again at the second side 22 so that the light is redirected back in the direction of the field of view. Optical analysis of the three-sided triple reflecting prism 14 shows that the prism 14 functions as an effective plane mirroring surface 23 positioned behind the prism 14 with lateral translation of the incident light along the effective mirror surface 23. Such a prism is disclosed and analysed in my United States patent application, Ser. No. 592,369, entitled, "Accidental Motion Compensation by Triple Reflection," filed on Nov. 7, 1966, and in my United States patent application, Ser. No. 652,325, entitled, "Accidental Motion Compensation for Optical Devices," and filed on July 10, 1967. Retroreflected light from the three-sided prism 14 is collimated by a collimating lens 16, rigidly mounted with respect to the camera housing 11. The retrodirected collimated light is folded and reflected by a second triple reflecting three-sided prism 31 of the type referred to above. Three-sided prism 31 is mounted for free movement relative to the camera housing 11 and optical elements connected thereto by, for example, gimbals providing a pivot point 32 near the apex of the three-sided prism 31. Placement of the pivot point for free movement of the prism, however, is not critical. The three-sided prism 31 is inertially stabilized by a gyroscope 33 which is mounted and coupled with the stabilized prism 31, for example, in the manner set forth in my United States patent application Ser. No. 757,252, entitled "Optical Device Gyro Linkage System," filed on even date herewith.

The collimated light displaced and retrodirected by the inertially stabilized three-sided prism 31 is received and converged by an imaging lens 41 to form a stabilized real image on the image plane or film plane 42.

Because the inertially stabilized three-sided prism 31 functions as an effective mirror in a plane 36 behind the prism, with displacement of the incident light along the surface of the effective mirroring plane, incident light is angularly deflected twice the angle of incident of light entering the face of three-sided prism 31. As illustrated in FIG. 2, upon deviation of the optical axis 19 of the camera and camera housing 11 from the original line of sight by an angle $\theta$, collimated light from the collimating lens 16 is angularly deflected in passing through prism 31 an angle equal to $2\theta$. Because this is twice the angle of reflection necessary for image stabilization, the collimating lens 16 is chosen to provide two-power angular magnification of the viewed field in order to compensate for the double angular deflection produced by prism 31. The light received by imaging lens 41 sees the same orientation for light rays in FIG. 2 as in FIG. 1, thereby providing a stabilized image on the image plane of film plane 42.

Upon deviation of the optical axis 19 of the objective lens 13 and camera housing 11, an angle $\theta$ from the original line of sight, light originally parallel to the optical axis of objective lens 13 enters at an angle $\theta$ with respect to the optical axis 19. By means of the two-power collimating lens 16 and the inertially stabilized triple reflecting prism 31, the retroreflected light received by imaging lens 41 is rendered parallel to the optical axis of the imaging lens 41 so that a stabilized image is formed upon the image plane or film plane 42. Thus, light entering the objective lens at an angle $\theta$ with respect to the optical axis of objective lens 13 due to angular deviation of the camera through an angle $\theta$ from an original line of sight is angularly deflected so that it emerges from prism 31 parallel to the optical axis of imaging lens 41 to provide stabilized images. The inertially stabilized triple reflecting prism 31 which functions as an effective mirror plane 36 positioned behind the prism with translation of the incident light provides twice the angular deflection between the incident and reflected light requisite for stabilization due to camera motion, but this is compensated for by the two-power collimating lens 16 so that the light is angularly deflected through a total angle $\theta$.

The triple reflecting prism 31 and gyroscope 33 may be coupled so that for small rapid angular deviations of the camera housing and optics from the original line of sight the prism 31 is inertially stabilized so that the effective mirroring plane 36 remains nearly perpendicular to the original line of sight while the large continuous angular motion, as in "panning" the prism 31 and gyroscope 33, follow the camera housing. Such a mounting system is described in my United States patent application, Ser. No. 652,325, entitled, "Accidental Motion Compensation for Optical Devices" and referred to above.

By means of the first and second triple reflecting prisms 14 and 31 the optical path in the camera is folded and compacted into a small state. It is apparent, however, that the principles of the present invention may be applied without such folding prisms. Thus, the invention may be embodied in an optical train in which the inertially stabilized optical element in a plane reflecting mirror or other optical element which performs an equivalent reflecting function. Compensation for double angular deflection is provided by a colliminating lens having double power angular magnification. Thus, light from a real image formed by the objective lens 13 and displayed on the transmissive image display plate 17 is collimated for passage through an inertially stabilized optical element which angularly deviates the transmitted light. Stabilized collimated light is then imaged by an imaging lens to form the stabilized image. Some types of image display plates invert the image received on the first surface and display the image on the second surface so that erecting optics must be appropriately added to the system.

Each of the foregoing embodiments of the invention has been described to effect 100% camera stabilization. For ocular viewing devices such as telescopes and binoculars the 100% camera stabilization is ideally modified by the factors hereinbefore referred to. Thus, in the embodiment of the invention described in FIGS. 1 and 2, the collimating lens 16 is provided with an angular magnification power of $2 \div (1 \pm 1/M)$ where the minus sign is used for erect images and the plus sign is used for inverted images. While 100% camera stabilization will provide satisfactory image stabilization and ocular viewing devices, modification in accordance with the above formulas approaches ideal image stabilization for many ocular viewing devices.

A variety of image stabilizing systems embodying these principles would be apparent without departing from the true spirit and scope of the following claims.

What is claimed is:

1. An image stabilizing system comprising: objective lens means adapted to form an image in a plane spaced from said objective lens means; a transmissive image display plate optically aligned with said objective lens means and having a first surface positioned in the focal plane of said objective lens means and a second surface adapted to display a real image received on said first surface and transmitted to said second surface; collimating lens means optically aligned with said plate and positioned to collimate light received from an image displayed on the second surface of said image display plate; an inertially stabilized optical element positioned in the optical path of said collimated light; and viewing means optically aligned with said stabilized optical element and forming an image from collimated light received from said inertially stabilized optical elements, said inertially stabilized optical element mounted for free movement relative to the objective lens means, image display plate, collimating lens and viewing means; wherein said collimating lens means is formed with substantially two-power angular magnification.

2. An image stabilizing system comprising: objective less means adapted to form an image in a plane spaced from said objective lens means; an image display plate optically aligned with said objective lens means and having a first surface positioned substantially in the focal plane of said objective lens means and a second surface adapted to display a real image formed on said first surface and transmitted to said second surface; first triple reflecting three-sided prism means optically aligned with said plate and adapted to receive light from an image displayed on said second surface and retroreflect said light, said first triple reflecting three-sided prism adapted to function as an effective plane mirror positioned behind the prism with lateral displacement of light across the surface of the effective plane mirror; collimating lens means optically aligned with said triple reflecting means adapted to collimate said retroreflected light, said collimating lens means providing substantially two-power angular magnification; second triple reflecting three-sided prism means optically aligned with said first triple reflecting means and adapted to retroreflect said collimated light, said second triple reflecting three-sided prism adapted to function as an effective plane mirror positioned behind the prism with lateral displacement of light across the surface of the effective plane mirror; and viewing means optically aligned with said triple reflecting means for viewing a stabilized image formed from said collimated light; said second triple reflecting three-sided prism means pivotally mounted for angular movement relative to the objective lens means, image display plate, first triple reflecting three-sided prism means, collimating lens means, and viewing means; and means inertially stabilizing said second triple reflecting three-sided prism means.

3. An image stabilizing system comprising: objective lens means adapted to form an image in a plane spaced from said objective lens means; a transmissive image display plate optically aligned with said objective lens means having a first surface positioned in the focal plane of said objective lens means and a second surface adapted to display a real image received on said first surface and transmitted to said second surface; collimating lens means optically aligned with said plate and positioned to collimate light received from an image displayed on the second surface of said image display plate, said collimating lens means providing substantially two-power angular magnification; an inertially stabilized optical element, functioning as a plane reflecting surface, said element positioned in the optical path of said collimated light; and optically aligned viewing means forming an image from collimated light received from said inertially stabilized optical element, said inertially stabilized optical element pivotally mounted for angular movement relative to the objective lens means, image display plate, collimating lens and viewing means.

References Cited
UNITED STATES PATENTS

| | | |
|---|---|---|
| 2,906,161 | 9/1959 | Thompson. |
| 2,944,783 | 7/1960 | MacLeish et al. |
| 3,026,620 | 3/1962 | Rantsch. |

DAVID SCHONBERG, Primary Examiner

P. R. GILLIAM, Assistant Examiner